US005227592A

United States Patent [19]

Kösters et al.

[11] Patent Number: 5,227,592

[45] Date of Patent: Jul. 13, 1993

[54] TWO-LAYER COATING AND PROCESS FOR ITS PRODUCTION

[75] Inventors: Bernhard Kösters, Eppelheim; Günther Butschbacher, Meckesheim, both of Fed. Rep. of Germany

[73] Assignee: Teroson GmbH, Heidelberg, Fed. Rep. of Germany

[21] Appl. No.: 690,403

[22] Filed: Apr. 23, 1991

[30] Foreign Application Priority Data

Apr. 26, 1990 [DE] Fed. Rep. of Germany ....... 4013318

[51] Int. Cl.[5] ............................................ F16F 7/12

[52] U.S. Cl. .................................... 181/207; 428/458; 428/480; 427/407.1; 427/409; 181/208; 181/290; 181/291; 181/294

[58] Field of Search ..................... 427/409, 247, 407.1; 428/458, 480; 181/290, 291, 294, 207, 208

[56] References Cited

U.S. PATENT DOCUMENTS 3,376,246 4/1968 Valentine et al. ................... 428/458
4,109,509 8/1978 Cramer et al. ............................ 73/23
4,199,486 4/1980 Boessler et al. ....................... 260/31
4,220,681 9/1980 Narita ................................. 428/463
4,346,782 8/1982 Böhm ................................. 427/409
5,088,576 2/1992 Potthoff et al. ...................... 181/291
5,104,741 4/1992 Greenlee et al. .................... 428/458

FOREIGN PATENT DOCUMENTS 3417729 11/1985 Fed. Rep. of Germany .

*Primary Examiner*—Shrive Beck
*Assistant Examiner*—Diana Dudash
*Attorney, Agent, or Firm*—Ernest J. Szoke; Wayne C. Jaeschke; Real J. Grandmaison

[57] ABSTRACT

A two-layer, vibration-absorbing and anti-corrosive, abrasion-resistant coating for rigid substrates, in particular for sheet metals in the underbody region of motor vehicles, for reducing the noise caused by impacting particles, comprises an inner layer, facing the substrate, of a polymer A and a plasticizer $P_1$, and a covering layer of a polymer B and a plasticizer $P_2$, such that either the polymers A and B have a different chemical composition and the polymer A is essentially incompatible with the plasticizer $P_2$ and the polymer B is essentially incompatible with the plasticizer $P_1$, or both layers contain essentially the same concentration of one plasticizer ($P_1 = P_2$), so that there is no risk of one layer being impaired by the plasticizer from the other layer.

10 Claims, 2 Drawing Sheets

TWO-LAYER COATING AND PROCESS FOR ITS PRODUCTION

The invention relates to a two-layer, vibration-absorbing and anti-corrosive, abrasion-resistant coating for rigid substrates, in particular for sheet metals in the underbody region of motor vehicles, which also acts to reduce the noise caused by impacting particles.

Because of insufficient damping, elastic structures, such as, for example, thin sheet metals of vehicle bodies or machine housings, radiate high proportions of airborne sound of various frequencies when excited by airborne sound o exposed to mechanical vibrations. It is known to apply viscoelastic sound dampening foils or coatings to the sound-radiating sheet metals for damping purposes.

Particularly in the case of motor vehicles impacting particles (stones and chippings, sand, water) which are thrown up against the wheel guards and the vehicle underbody by the wheels are a further cause of troublesome noise. This noise has a particularly disturbing and unpleasant effect, because it contains a consider-able proportion of higher-frequency sounds. A known solution for this problem is to insert a plastics shell, made e.g. from polypropylene, into the wheel housing. Such shells are attached so that they are suspended a few millimeters in front of the sheet-metal of the wheel housing. This is admittedly effective, but it is also complicated and relatively expensive.

A further conceivable possibility would be to prevent the particles from directly striking the sheet metals in the underbody region of motor vehicles by applying suitable coatings to the sheet structure. Such a coating would have to be as soft and as thick as possible to provide a "long braking path", both as regards distance and time, for the flying particles. In this way a considerable reduction in the production of noise could be achieved, especially in the higher frequency, particularly disturbing frequency range. A fundamental physical law, the Fourier transform, states that the behavior of a system in time is closely linked with its associated behavior in the frequency range: the more quickly a process takes place in time, the more higher frequencies are necessary for the description of this process in the frequency range. Short, abrupt processes contain more high frequencies than longer lasting, less abrupt processes.

The production of a vibration-absorbing, simultaneously anti-corrosive, abrasion-resistant coating on a rigid substrate is known from German Patent Specification 28 52 828, wherein two coating compositions are successively applied which after hardening have a different modulus of elasticity. Here the inner layer facing the substrate is softer than the outer covering layer. A considerable improvement in the sound absorption can be achieved using these coatings. For the production of the coating, two different plastisols are applied and gelled by heating and thus cured. The inner (softer) layer can optionally also be foamed.

The problem of reducing noise caused by impacting particles is not addressed in German Patent Specification 28 52 828. Moreover, it has emerged that the coatings indicated therein are not stable in the longer term, but that their mechanical and therefore also their acoustic properties alter with time. For use in the construction of motor vehicles, a coating must, however, be formed such that the requirements made of it are not only met at the beginning but, if possible, for the whole of the life of the vehicle.

The basic object of the invention is therefore to develop a coating for rigid substrates, particularly for sheet metals in the underbody region of motor vehicles, including the wheel guards, which has a vibration-absorbing effect and is also anti-corrosive and abrasion-resistant, and which furthermore simultaneously leads to a considerable reduction in the noise caused by impacting particles. It is moreover essential that the coating possesses these properties practically unchanged for long periods of time.

With the invention a two-layer coating is proposed which consists of an inner layer facing the substrate and a covering layer, such that after gelling and/or curing the inner layer is softer than the covering layer and has a greater layer-thickness; this coating is characterized in that a) the inner layer contains a polymer A and a plasticizer $P_1$ and b) the covering layer contains a polymer B and a plasticizer $P_2$ such that either the polymers A and B have a different chemical composition and the polymer A is essentially incompatible with the plasticizer $P_2$ and the polymer B is essentially incompatible with the plasticizer $P_1$, or the two layers contain essentially the same concentration of one plasticizer ($P_1=P_2$) so that there is no risk of one layer being impaired by the plasticizer from the other layer.

According to a preferred embodiment the inner layer is foamed, whereby both its softness and its layer thickness are increased. In general the inner layer has a 2 to 20× greater thickness than the covering layer. The modulus of elasticity of the inner softer layer should generally be $<10^8$ dyn/cm$^2$. The weight per unit area of the coating as a whole is preferably less than that of the substrate.

A coating which meets the requirements mentioned above must at the same time be very soft and as thick as possible, so that it can effectively stop the impacting particles. In addition, it should be as effective as possible as a vibration-absorbing anti-hum compound. For practical use, it is, however, also essential that the coating provides good protection against corrosion and above all has high abrasion-resistance. This is especially the case in the region of the wheel guards. A high degree of softness and good abrasion-resistance are contradictory requirements which are, however, met by the two-layer coating according to the invention. The layer arranged on the sheet-metal side is softer and relatively thick so that it fulfils the acoustic requirements that have been set. Its thickness is generally in the range of from 1 to 5 mm. The covering layer is thinner and relatively viscoelastic so that it ensures abrasion resistance. A thickness in the range of 0.25 to 1 mm is preferred.

For practical purposes it is very important that the properties of both layers are stable in the long term, i.e. the covering layer must be permanently viscoelastic and abrasion-resistant, while the soft inner layer must remain permanently soft. According to the invention this is ensured by the composition of the two layers being matched to each other so that there is no migration of plasticizer from one layer into the other or so that, due to its incompatibility, the migrating plasticizer does not impair the physical properties of the other polymer layer. This can be achieved in various ways:

If the polymers in the inner soft layer and in the hard covering layer have a different chemical composition, then plasticizers are chosen for the two layers which are each incompatible with the polymer of the other layer. Normally a relatively high plasticizer content is necessary for the inner layer to attain the desired greater softness, which, due to the concentration gradient, may result in the plasticizer migrating into the covering layer. If the plasticizer of the inner layer is incompatible with the polymer of the covering layer, this prevents softening of the covering layer. The incompatibility of the plasticizers with the polymer of the other layer in each case prevents any impairment of the mechanical properties of the layers.

Another solution to the problem is to use essentially the same plasticizer concentration for both layers when the same plasticizer is used and in this way to prevent any migration of the plasticizer. The necessary higher degree of softness of the inner layer is achieved in this case by foaming.

Taking these measures ensures the required long-term stability of the mechanical properties of the coating. In German Patent Specification 28 52 828, mentioned above, there are no indications suggesting this and the examples given there do not meet the requirements named above: In Example 1 the plasticizer used for the inner layer is arylalkyl sulphonate, which is also compatible with polyvinyl chloride, the polymer of the covering layer, and therefore softening of the covering layer occurs due to migration of the plasticizer. In Example 2 the same plasticizer is used in different concentrations for the two layers, and due to the concentration gradient this also results in a migration of the plasticizer.

Plastisols such as have been accepted for a fairly long time as underseals, weld-seam sealings, adhesives and the like in automobile production, as is already known in principle from German Patent Specification 28 52 828, are used for the production of the two-layer coatings according to the invention. The coating can be applied particularly advantageously in such a manner that the two layers are formed in successive spraying procedures (wet-on-wet application), with the gelling of the layers taking place simultaneously and together by a subsequent heat treatment. It is, however, also possible to pre-gel the inner layer by heating after application and where applicable to foam it and only then to apply the covering layer. Heating takes place for 10 to 60 minutes at about 100° to 180 ° C. to gel the plastisols.

The necessary different softness of the layers is, as already discussed, achieved either by a higher content of plasticizer in the inner layer and/or by a foaming of the inner layer.

Powders of polyvinyl chloride homo- and/or copolymers, e.g. with vinyl acetate, are particularly suitable as the polymers for the plastisols. Also suitable are powders of (meth)acrylate homo- and/or copolymers, as described in German Patent Specifications 24 54 235 and 25 29 732. The term (meth)acrylate refers to methacrylate and acrylate. So-called core/shell acrylic polymers as in German Auslegeschrift 27 22 752 can also be used advantageously.

For polyvinyl chloride homo- and copolymers, numerous suitable plasticizers are known, such as phthalates, phosphates, adipates and citric acid esters. Particularly preferred are dialkyl phthalates such as, for example, dioctyl phthalate and dinonyl phthalate, because they are incompatible with (meth)acrylate homo- and copolymers. For the latter, dibenzyl ethers, dibenzyl toluene, diphenyl methane and also diphenyl ethers are particularly suitable, because they are themselves not compatible with vinyl chloride homo- and copolymers. On the other hand, e.g. arylalkyl sulphonates are compatible with both groups of polymers, so that they can be put to use only when the plasticizer concentration in both layers is essentially identical.

Suitable blowing agents which are activated during the gelling of the plastisols are known to the expert. Some that can be named are, for example, azodicarbonamide, azoisobutyric acid nitrile, dinitrosodimethyl terephthalamide and where appropriate also water.

The mechanical properties of the layers, in particular the hardness and the abrasion resistance, can be influenced by the addition of inorganic fillers in a manner known per se. Suitable fillers are, for example, calcium carbonate and calcium oxide, barium sulphate, carbon black, graphite, titanium dioxide, talc and organic or inorganic microspheres.

The following examples serve for the more detailed explanation of the invention.

EXAMPLE 1

The plastisol for the production of the inner softer layer had the following composition:

| | |
|---|---|
| polymethyl-n-butyl methacrylate (with 2% vinyl imidazole) | 20% |
| dibenzyl toluene | 50% |
| calcium carbonate | 28% |
| calcium oxide | 2% |
| For the production of foamed layers where necessary azodicarbonamide was added. | 1% |

A plastisol of the following composition was used for the covering layer:

| | |
|---|---|
| polyvinyl chloride (K-value 70, paste type) | 30% |
| dinonyl phthalate | 30% |
| calcium carbonate | 38% |
| calcium oxide | 2% |

The two plastisols were sprayed wet-on-wet onto a metal sheet and baked by heating for 30 minutes at 160° C. Two-layer coatings were obtained which not only had excellent abrasion resistance but also exhibited a very good damping behavior, and which are capable of absorbing to a great extent the energy of impacting particles and of bringing about a quite considerable noise reduction, cf. the results given in Example 3 for experiments C, D, E and F.

EXAMPLE 2

A foamable plastisol for the production of the inner, softer layer had the following composition:

| | |
|---|---|
| polyvinyl chloride | 30% |

-continued

| | |
|---|---|
| dinonyl phthalate | 30% |
| calcium carbonate | 36% |
| calcium oxide | 2% |
| polyaminoamide | 1% |
| azodicarbonamide | 1% |

The same plastisol was used for the covering layer as in Example 1.

EXAMPLE 3

The coatings indicated below were tested in the APAMAT® to see how effectively the sound caused by stone impact, spray water etc. can be reduced in each case. In the APAMAT®, however, in principle, only more or less flat samples can be tested. The wheel housing metal sheets are, however, not at all flat and therefore their rigidity is considerably increased compared to a flat metal sheet. In order to reproduce approximately this increase in rigidity, flat 1-mm thick steel plates (84×84 cm) were braced, with 3 rivets in each case serving to fix the struts in place. The actual fixing was carried out with TEROKAL® 4520-34 (Teroson GmbH), an extremely well adhering and completely curing single-component adhesive.

Each metal sheet braced in this way was first measured as it was and then with the coating, with the following arrangement being used for the measurement:

| |
|---|
| APAMAT ® receiver cabin with microphone |
| stiffened steel sheet |
| test coating |
| APAMAT ® ball sling |

Figure 1:
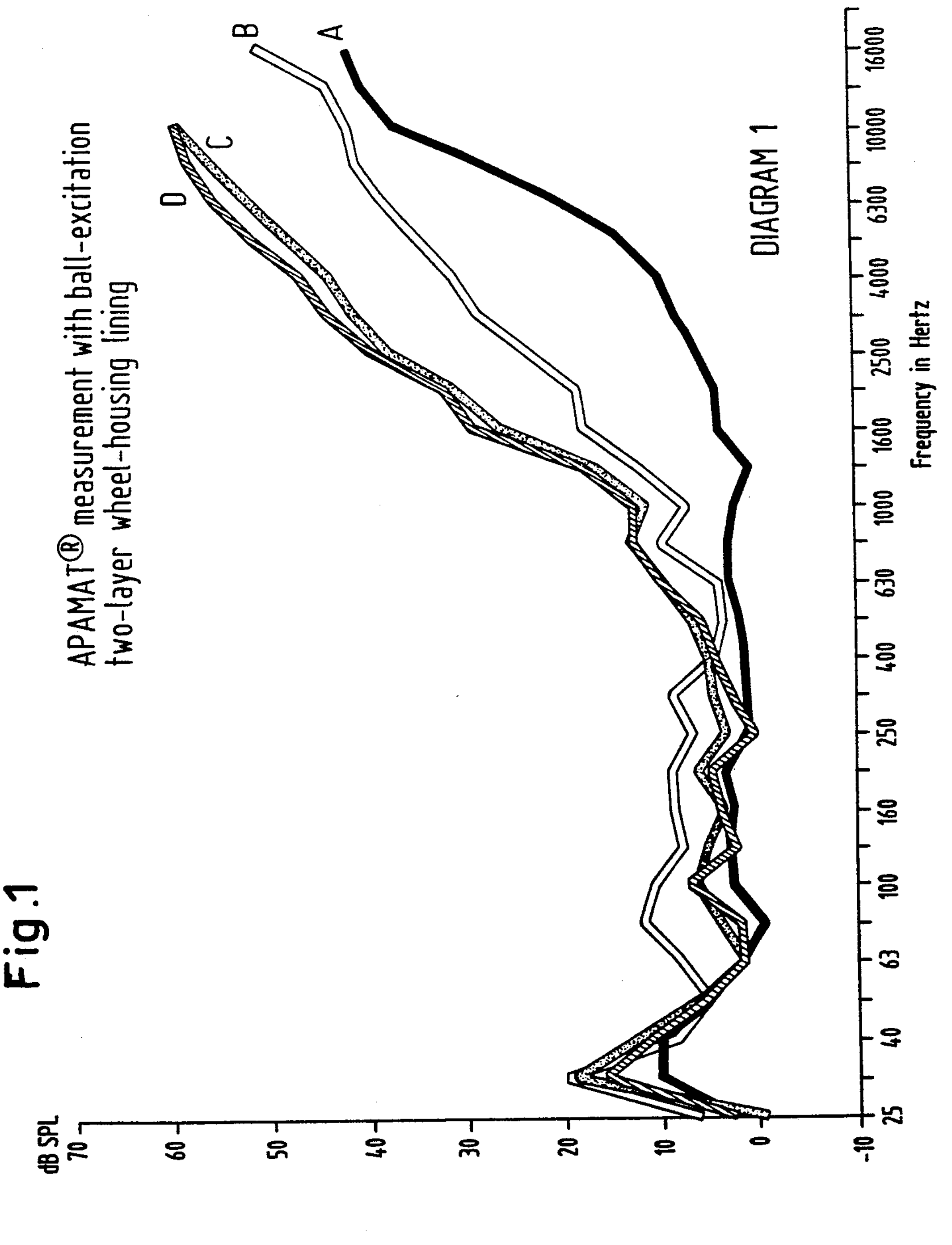
FIG. 1 shows the noise reduction obtained in Example 3 with coatings C and D according to the invention over prior art coatings A and B.
Figure 2:
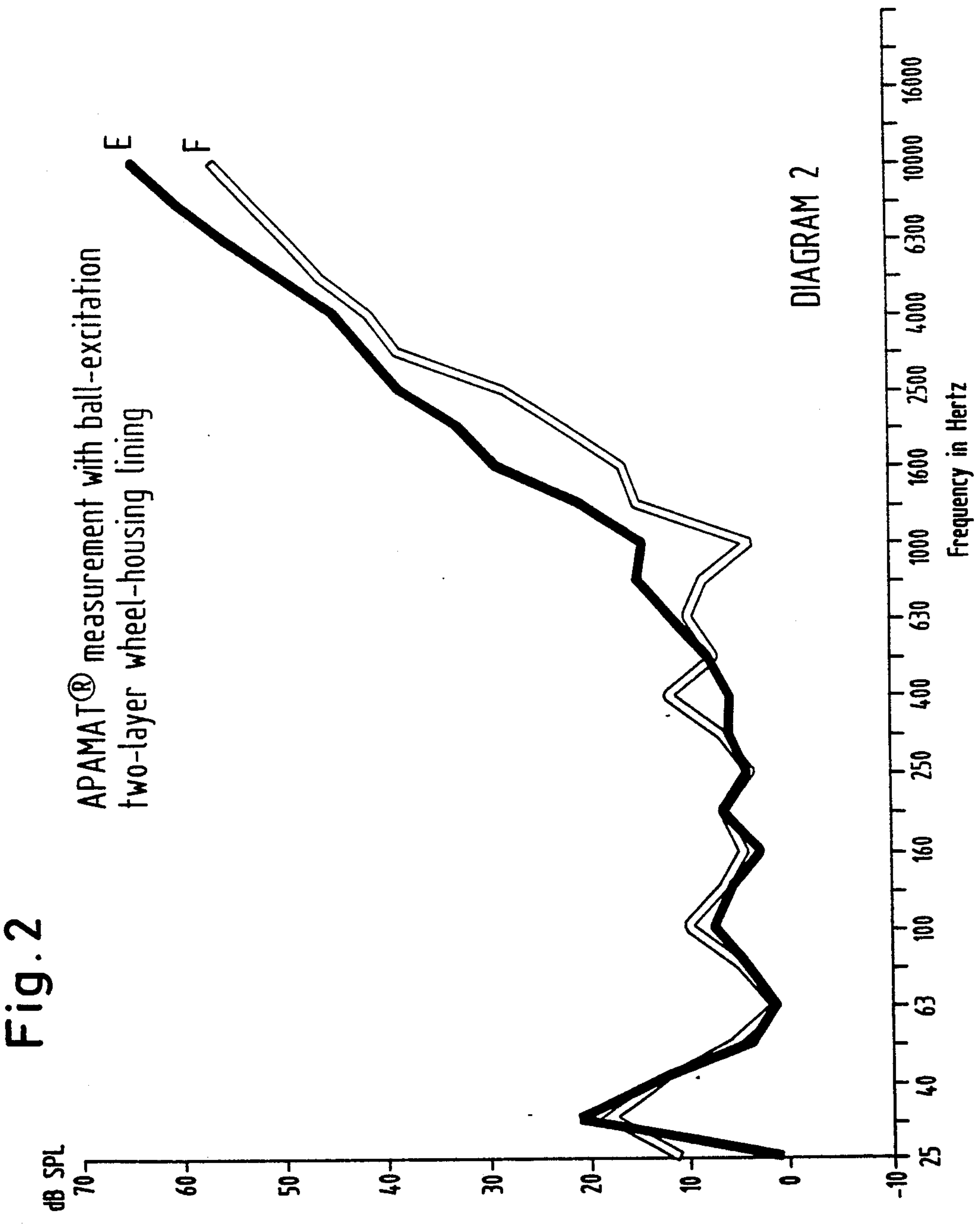
FIG. 2 shows the noise reduction obtained in Example 3 with the coatings E and F according to the invention.

The third sound pressure spectrum of the untreated metal sheet as determined in the receiving cabin of the APAMAT® was stored and acted as a reference. The reference spectra of all the braced control sheets were practically identical. The third spectra with the coating in each case were also determined and then subtracted from the reference spectrum of the substrate sheet. The differential spectra thus formed are a measure of the effectiveness of the respective coating. They are shown in FIGS. 1 and 2.

The steel sheets braced as described above (each 84×84 cm; 6.7 kg weight), were provided with the following coatings:

A TEROTEX® 3105-147 (Teroson GmbH) in a layer thickness of approx. 1.2 mm (coating weight approx. 1 kg). This is a commercially available PVC-plastisol for the undersealing of motor vehicles.

B 2 to 3-mm thick (3.4 kg) polypropylene/EPDM sheet placed in front. This variant corresponds to a wheel housing lining according to the state of the art.

C A two-layer coating as in Example 1 was applied. The inner layer was foamed and had a thickness of approx. 5.5 mm, the thickness of the outer layer was approx. 1 mm. The total coating weight was 3 kg.

D A two-layer coating as in Example 1 was applied. The inner layer was foamed and had a layer thickness of approx. 4 mm, and the layer thickness of the covering layer was approx. 0.5 mm. The total coating weight was 2.4 kg.

E A two-layer coating as in Example 1 was applied, the inner layer was foamed and had a layer thickness of approx. 7 mm. The thickness of the covering layer was approx. 1 mm, and the total coating weight was 3.3 kg.

F A coating as in Example 1 was applied; the inner layer was not foamed and had a layer thickness of approx. 3 mm. The layer-thickness of the covering layer was about 1 mm. The total coating weight was 3.7 kg.

The results of the APAMAT® measurements with ball excitation are shown in diagrams 1 and 2. The acoustic effectiveness of the coatings depends on their softness and thickness. Soft, thick coatings drastically reduce the vibration excitation of the sheet above a certain critical frequency. This critical frequency shifts to lower frequencies as the coating becomes softer or thicker. The rigid covering layers, which are necessary to ensure sufficient abrasion resistance, somewhat reduce the effectiveness of the underlying soft coating. The covering layers should therefore not be thicker than absolutely necessary.

In detail the measurement results show the following:

The single-layer coating of abrasion-resistant PVC plastisol (A) is clearly inferior to all the other variants.

The polypropylene sheet (B) is clearly inferior to the coatings according to the invention particularly at higher frequencies.

The coatings C and D according to the invention exhibit an excellent behavior, particularly at somewhat higher frequencies.

The comparison of the coatings E and F shows the good effectiveness of a coating in which the inner layer is not foamed; effectiveness is, however, improved still further by foaming.

EXAMPLE 4

The following table illustrates the long-term behaviour of a coating according to the invention compared to a coating similar to that in Example 1 of German Patent Specification 28 52 828. Unlike the Example 1 according to the invention, in the comparative experiment the plastisol for the inner layer contained, instead of dibenzyl toluene, a mixture of arylalkyl sulphonate and dibenzyl toluene in the ratio 1:1 as plasticizer. The arylalkyl sulphonate is compatible both with the methacrylate terpolymer and with PVC.

In the following table, the values are given for the tensile strength of the two coatings after a fairly long storage time of up to 8 weeks. In the case of the coating according to the invention as in Example 1, it is seen that the tensile strength slowly increases during the storage; this is the typical behavior of normal PVC plastisols during ageing. In the comparative experiment on the other hand a reduction in the tensile strength values appears due to a migration of the alkylaryl sulphonate from the methacrylate layer into the PVC layer, whereby the latter becomes softer. The tensile strength of the 2-layer systems is essentially determined by the viscoelastic PVC plastisol layer, and therefore a change therein is responsible for the deterioration observed.

Tensile strength ($N/cm^2$) of the two-layer underbody coating

| | immediately | after 2 weeks | after 4 weeks | after 8 weeks |
|---|---|---|---|---|
| Example 1 | 200 | 213 | 216 | 277 |
| Comparative experiment | 194 | 182 | 149 | 174 |

-continued

| Tensile strength ($N/cm^2$) of the two-layer underbody coating | | | | |
|---|---|---|---|---|
| | immediately | after 2 weeks | after 4 weeks | after 8 weeks |
| Difference | 6 | 31 | 67 | 103 |

What is claimed is:

1. A rigid substrate coated with a two-layer, vibration-absorbing, sound-damping, anti-corrosive and abrasion-resistant coating composition, said composition consisting essentially of an inner layer adhering to said substrate and an outer layer adhering to said inner layer wherein after gelling or curing of said coating composition said inner layer is softer and thicker than said outer layer, said inner layer consisting essentially of a first polymer and a first plasticizer, said outer layer consisting essentially of a second polymer and a second plasticizer, said first polymer and said second polymer having a chemical composition which is different from each other, wherein said first polymer is essentially incompatible with said second plasticizer and said second polymer is essentially incompatible with said first plasticizer, or wherein said inner layer and said outer layer contain essentially the same concentration of one of said first plasticizer, or said second plasticizer, whereby migration of plasticizer from one layer to the other layer is prevented.

2. A rigid substrate as in claim 1 wherein said inner layer is foamed.

3. A rigid substrate as in claim 1 wherein said inner layer is about 2 to about 20 times thicker than said outer layer.

4. A rigid substrate as in claim 1 wherein said inner layer has a modulus of elasticity of less than about $10^8$ $dynes/cm^2$.

5. A rigid substrate as in claim 1 wherein the weight per unit area of said coating composition is less than that of said substrate.

6. A rigid substrate as in claim 1 wherein said first polymer consists essentially of a acrylate homopolymer or copolymer.

7. A rigid substrate as in claim 1 wherein said second polymer consists essentially of vinyl chloride homopolymer or copolymer.

8. A rigid substrate as in claim 1 wherein said first plasticizer is selected from the group consisting of dibenzyl ether, dibenzyl toluene, diphenyl methane and diphenyl ether.

9. A rigid substrate as in claim 1 wherein said second plasticizer is a dialkyl phthalate.

10. A rigid substrate as in claim 1 wherein said coating composition contains a filler.

* * * * *